(12) United States Patent
Shenkerman

(10) Patent No.: US 10,766,553 B2
(45) Date of Patent: Sep. 8, 2020

(54) FOLDING BICYCLE LOCK WITH JOINT PROTECTION

(71) Applicant: Ino Vision Ltd., Herzliya (IL)

(72) Inventor: Michael Shenkerman, Rishpon (IL)

(73) Assignee: Ino Vision Ltd., Herzliya (IL)

( * ) Notice: Subject to any disclaimer, the term of this patent is extended or adjusted under 35 U.S.C. 154(b) by 54 days.

(21) Appl. No.: 16/095,362

(22) PCT Filed: Apr. 20, 2017

(86) PCT No.: PCT/IB2017/052276
§ 371 (c)(1),
(2) Date: Oct. 21, 2018

(87) PCT Pub. No.: WO2017/182979
PCT Pub. Date: Oct. 26, 2017

(65) Prior Publication Data
US 2019/0135361 A1    May 9, 2019

Related U.S. Application Data

(60) Provisional application No. 62/325,021, filed on Apr. 20, 2016.

(51) Int. Cl.
*B62H 5/00* (2006.01)
*E05B 67/00* (2006.01)
*E05B 71/00* (2006.01)

(52) U.S. Cl.
CPC .............. *B62H 5/001* (2013.01); *B62H 5/00* (2013.01); *B62H 5/003* (2013.01); *E05B 67/003* (2013.01); *E05B 71/00* (2013.01)

(58) Field of Classification Search
CPC .......... B62H 5/001; B62H 5/00; B62H 5/003; E05B 67/003; E05B 71/00; E05B 73/00; E05B 73/0005; Y10T 16/537; Y10T 16/5377
USPC ........ 70/14, 16, 18, 30, 49, 51, 53, 58, 233, 70/386, 417
See application file for complete search history.

(56) References Cited

U.S. PATENT DOCUMENTS 2,959,168 A * 11/1960 Shook ................... A61F 5/0125
602/26
3,397,903 A * 8/1968 Archdale .................. A61F 2/64
403/113

(Continued)

FOREIGN PATENT DOCUMENTS

DE      102010036636 A1 *  2/2012
DE      202015104106         8/2015
EP          2949841          12/2015

OTHER PUBLICATIONS

PCT Search and Written Opinion PCT/IB2017/052267, dated Jul. 27, 2017.

*Primary Examiner* — Lloyd A Gall
(74) *Attorney, Agent, or Firm* — Dekel Patent Ltd.; David Klein

(57) ABSTRACT

A bicycle lock (10) includes a plurality of link members (12), which are pivotally connected to one another by joint members (14). Each joint member (14) passes through an aperture (24) formed in each link member (12). One of the link members (12) is connected to a locking device (16). A joint member protector (203-217), which has a rounded surface, is adjacent each joint member (14).

6 Claims, 5 Drawing Sheets

(56) References Cited

U.S. PATENT DOCUMENTS

| | | | | |
|---|---|---|---|---|
| 5,568,740 A * | 10/1996 | Lin | ............ | E05B 67/003 70/18 |
| 5,732,577 A * | 3/1998 | Okada | ............ | B62H 5/003 403/162 |
| 7,481,084 B1 * | 1/2009 | Wu | ............ | E05B 67/003 70/18 |
| 7,712,339 B2 * | 5/2010 | Hentschel | ............ | E05B 37/025 70/14 |
| 8,156,772 B2 * | 4/2012 | Buhl | ............ | E05B 67/003 70/14 |
| 8,429,940 B2 * | 4/2013 | Evans | ............ | E05B 67/003 70/360 |
| 8,881,559 B1 * | 11/2014 | Chang | ............ | E05B 67/003 70/14 |
| 2008/0115548 A1 * | 5/2008 | Su | ............ | E05B 67/003 70/266 |

* cited by examiner

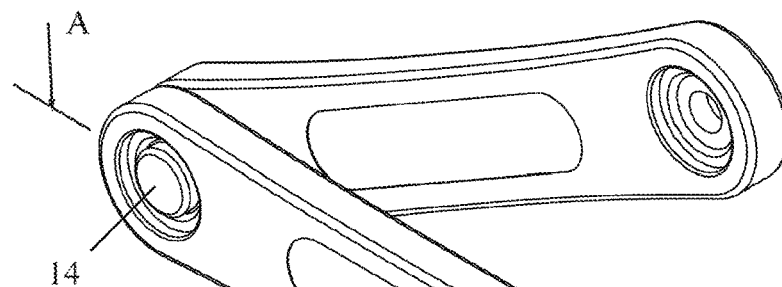
FIG. 2
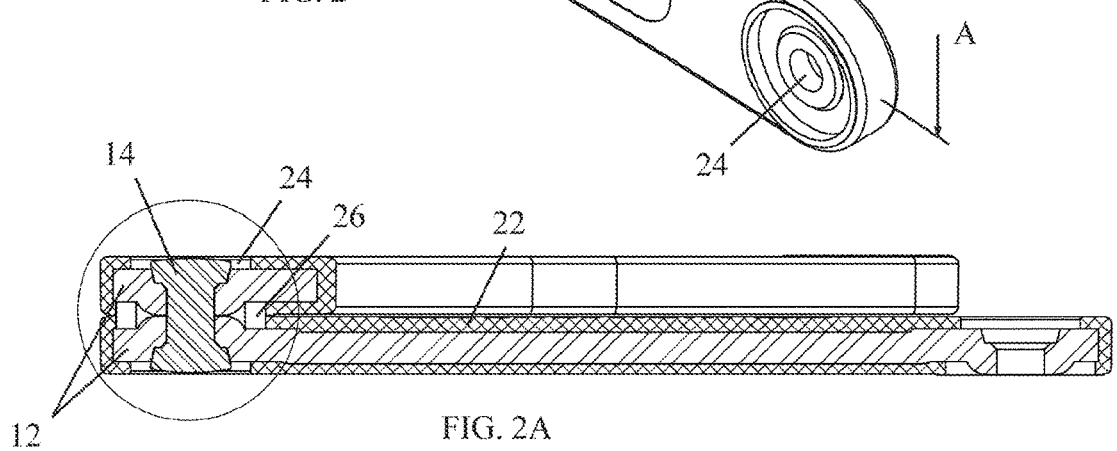
FIG. 2A
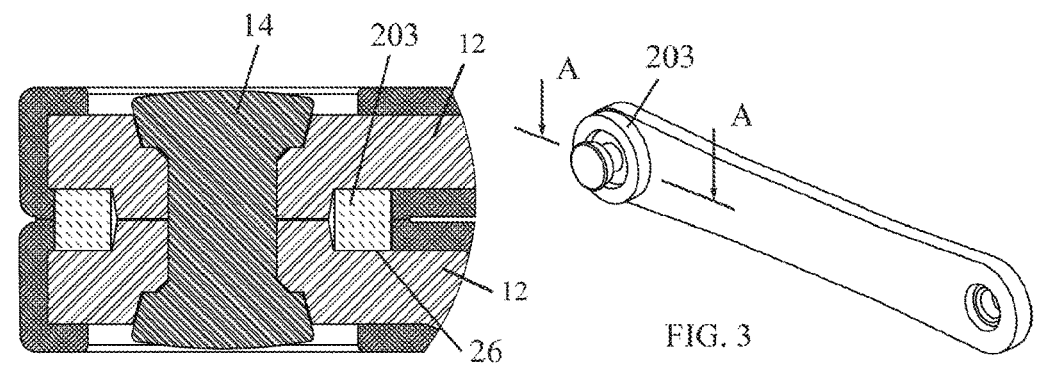
FIG. 3
FIG. 3A
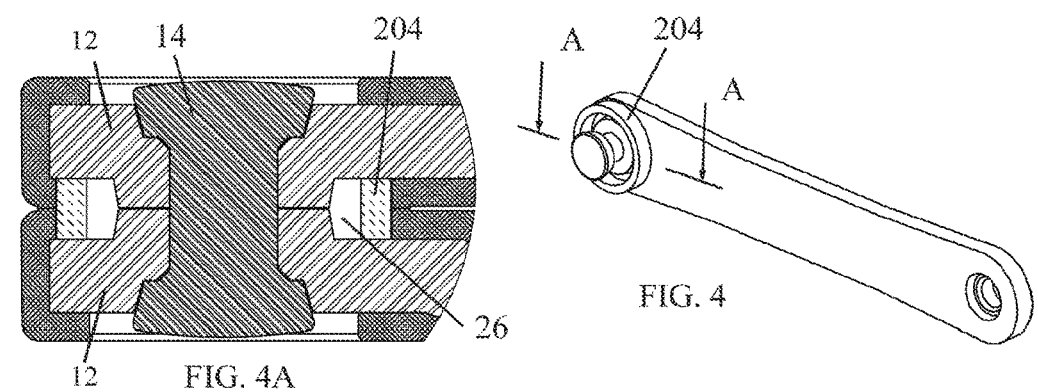
FIG. 4
FIG. 4A

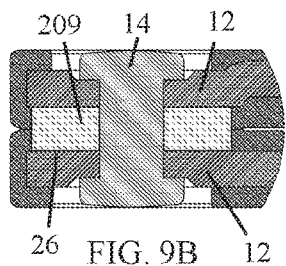
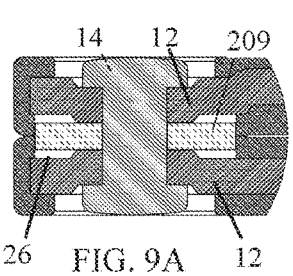
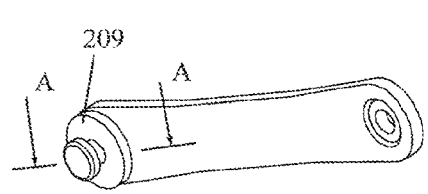
FIG. 9B  FIG. 9A  FIG. 9
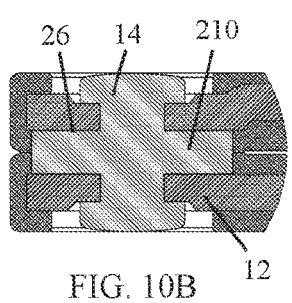
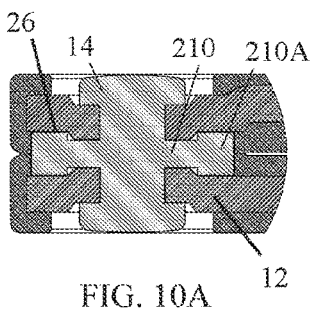
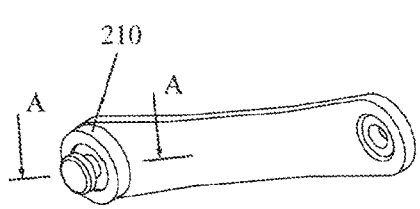
FIG. 10B  FIG. 10A  FIG. 10
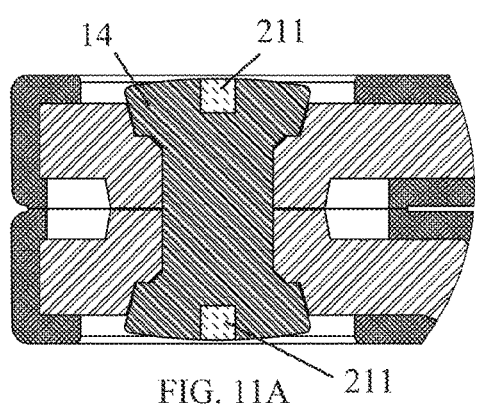
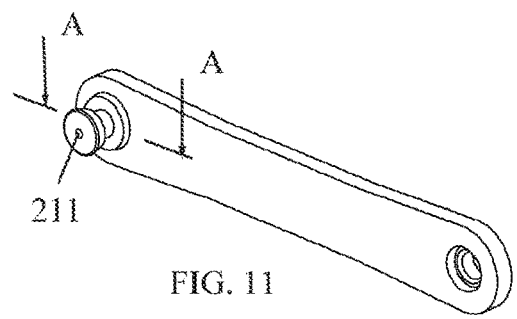
FIG. 11A  FIG. 11
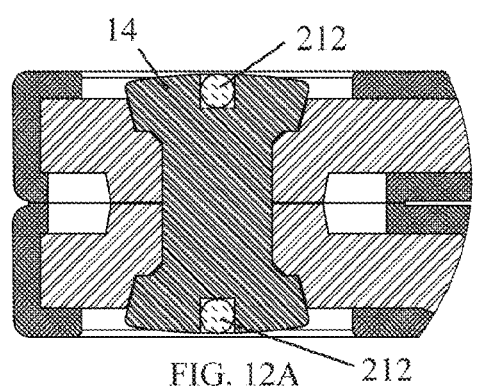
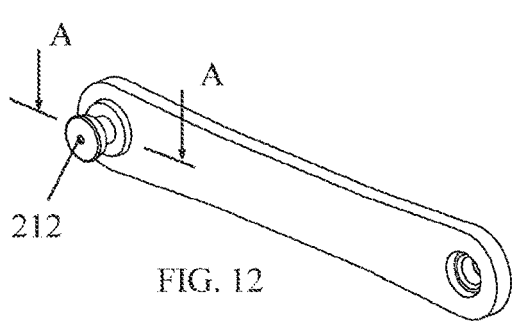
FIG. 12A  FIG. 12

US 10,766,553 B2

FOLDING BICYCLE LOCK WITH JOINT PROTECTION

FIELD OF THE INVENTION

This invention relates generally to bicycle locks, and particularly to a folding lock with tamper protection of the joints, such as the rivets that form the joints of the lock.

BACKGROUND OF THE INVENTION

There are many types of bicycle locks, ranging from cables, chains, U-locks and folding locks.

Cable locks are very light and inexpensive but provide minimal security against theft, since they are easily cut or broken.

Chain locks have metal chain links covered by a protective sleeve and are locked by a padlock. Portable chains can be wrapped around the seat post.

U-locks are lighter than chains and easily transported by affixing to a carrier mounted on the bicycle frame.

Chain links and U-lock shackles with diameters of less than about 13 mm can be cut with medium-sized bolt cutters. Larger diameters provide better protection against bolt cutters, but have the disadvantage of higher weight and price.

Folding locks are made up of a series of metal bars (flat plate bar links), which are linked together by joints, typically rivets. The rivets allow the bar links to rotate so they can be folded into a compact configuration for storage on the bicycle and folded out for fastening the bicycle to an object.

The weakest part of the folding lock is the joint: bolt cutters can cut through the rivets.

SUMMARY OF THE INVENTION

The present invention seeks to provide a novel folding bicycle lock with tamper protection of the joints, such as the rivets or pins that form the joints of the lock. The term bicycle encompasses personal transportation vehicles with two or three wheels, such as but not limited to, human and motor powered bicycles and tricycles, velocipedes, motorbikes, motorcycles and the like. The present invention solves the problem of cutting the rivet or pin (referred to as the joint member) by placing a joint member protector adjacent each joint member, such as a protective sleeve around the joint member and/or a protective cap or pin over or inside the joint member. For example, the sleeve prevents the bolt cutter from cutting the joint member, and the cap prevents drilling though the joint member, as is described below.

There is thus provided in accordance with an embodiment of the invention a bicycle lock including a plurality of link members pivotally connected to one another by joint members, one of the link members being connected to a locking device, and a joint member protector adjacent each joint member.

BRIEF DESCRIPTION OF THE DRAWINGS

The present invention will be understood and appreciated more fully from the following detailed description taken in conjunction with the drawings in which:

FIGS. 2 and 2A are simplified pictorial and sectional illustrations of links of the bicycle lock, FIG. 2A being taken along lines A-A in FIG. 2;

FIGS. 3 and 3A are simplified pictorial and sectional illustrations of a link of the bicycle lock, FIG. 3A being taken along lines A-A in FIG. 3, wherein FIG. 3A shows a joint member protector in accordance with a non-limiting embodiment of the invention;

FIGS. 4 and 4A are simplified pictorial and sectional illustrations of a link of the bicycle lock, FIG. 4A being taken along lines A-A in FIG. 4, wherein FIG. 4A shows a joint member protector in accordance with a non-limiting embodiment of the invention;

FIGS. 5 and 5A are simplified pictorial and sectional illustrations of a link of the bicycle lock, FIG. 5A being taken along lines A-A in FIG. 5, wherein FIG. 5A shows a joint member protector in accordance with a non-limiting embodiment of the invention;

FIGS. 6 and 6A are simplified pictorial and sectional illustrations of a link of the bicycle lock, FIG. 6A being taken along lines A-A in FIG. 6, wherein FIG. 6A shows a joint member protector in accordance with a non-limiting embodiment of the invention;

FIGS. 7 and 7A are simplified pictorial and sectional illustrations of a link of the bicycle lock, FIG. 7A being taken along lines A-A in FIG. 7, wherein FIG. 7A shows a joint member protector in accordance with a non-limiting embodiment of the invention;

FIGS. 8 and 8A are simplified pictorial and sectional illustrations of a link of the bicycle lock, FIG. 8A being taken along lines A-A in FIG. 8, wherein FIG. 8A shows a joint member protector in accordance with a non-limiting embodiment of the invention;

FIGS. 9, 9A and 9B are simplified pictorial and two sectional illustrations of a link of the bicycle lock, FIGS. 9A and 9B both being taken along lines A-A in FIG. 9, wherein FIGS. 9A and 9B show joint member protectors in accordance with different non-limiting embodiments of the invention;

FIGS. 10, 10A and 10B are simplified pictorial and two sectional illustrations of a link of the bicycle lock, FIGS. 10A and 10B both being taken along lines A-A in FIG. 10, wherein FIGS. 10A and 10B show joint member protectors in accordance with different non-limiting embodiments of the invention;

FIGS. 11 and 11A are simplified pictorial and sectional illustrations of a link of the bicycle lock, FIG. 11A being taken along lines A-A in FIG. 11, wherein FIG. 11A shows a joint member protector in accordance with a non-limiting embodiment of the invention;

FIGS. 12 and 12A are simplified pictorial and sectional illustrations of a link of the bicycle lock, FIG. 12A being taken along lines A-A in FIG. 12, wherein FIG. 12A shows a joint member protector in accordance with a non-limiting embodiment of the invention;

FIGS. 13 and 13A are simplified pictorial and sectional illustrations of a link of the bicycle lock, FIG. 13A being taken along lines A-A in FIG. 13, wherein FIG. 13A shows a joint member protector in accordance with a non-limiting embodiment of the invention;

FIGS. 14 and 14A are simplified pictorial and sectional illustrations of a link of the bicycle lock, FIG. 14A being taken along lines A-A in FIG. 14, wherein FIG. 14A shows a joint member protector in accordance with a non-limiting embodiment of the invention;

FIGS. 15 and 15A are simplified pictorial and sectional illustrations of a link of the bicycle lock, FIG. 15A being taken along lines A-A in FIG. 15, wherein FIG. 15A shows a joint member protector in accordance with a non-limiting embodiment of the invention;

FIGS. 16 and 16A are simplified pictorial and sectional illustrations of a link of the bicycle lock, FIG. 16A being taken along lines A-A in FIG. 16, wherein FIG. 16A shows a joint member protector in accordance with a non-limiting embodiment of the invention; and FIGS. 17 and 17A are simplified pictorial and sectional illustrations of a link of the bicycle lock, FIG. 17A being taken along lines A-A in FIG. 17, wherein FIG. 17A shows a joint member protector in accordance with a non-limiting embodiment of the invention.

DETAILED DESCRIPTION OF EMBODIMENTS

Figure 1A:
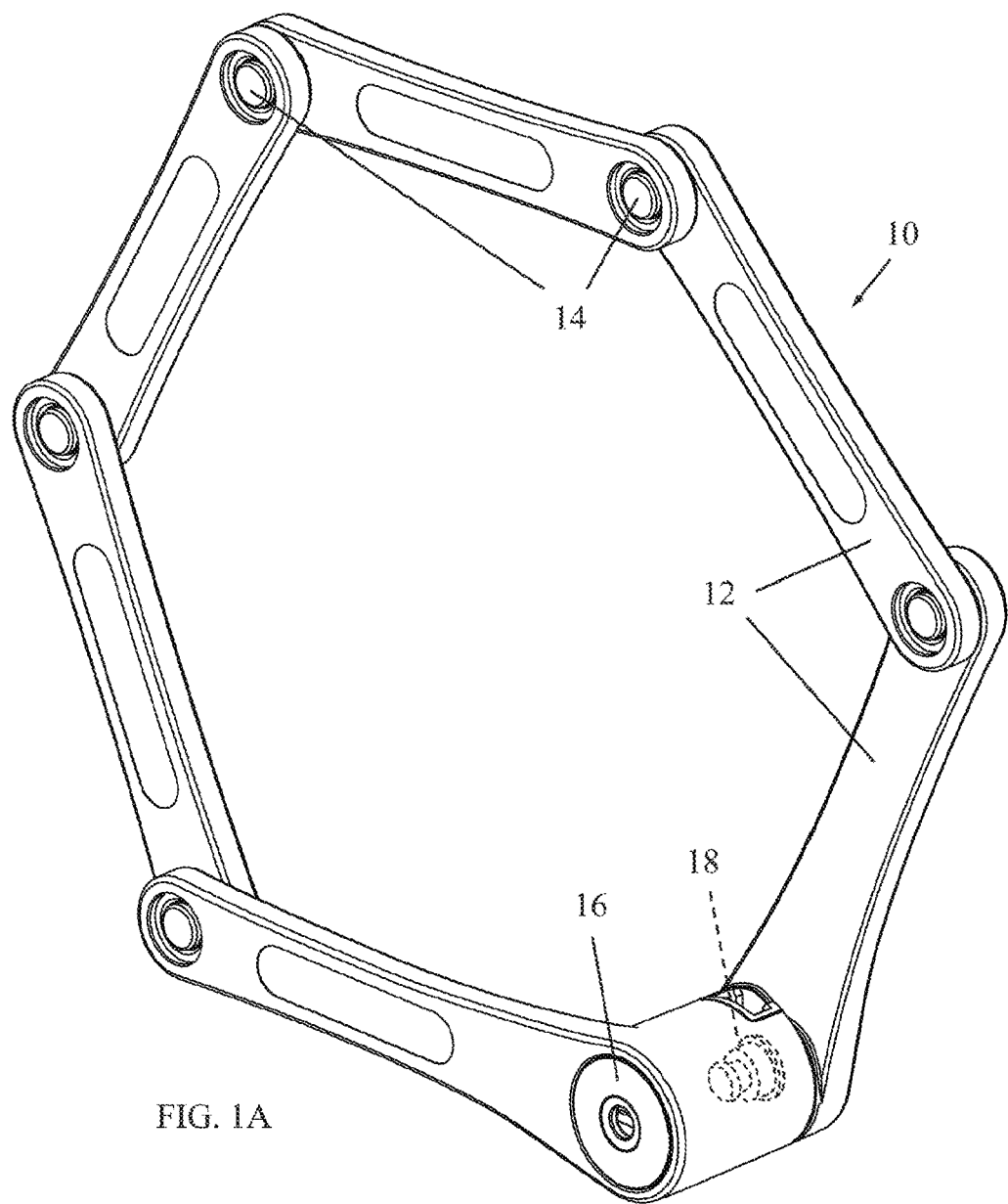
FIGS. 1A-1B are simplified pictorial illustrations of a folding bicycle lock, in accordance with a non-limiting embodiment of the invention, in respective expanded and compact orientations.
Figure 1B:
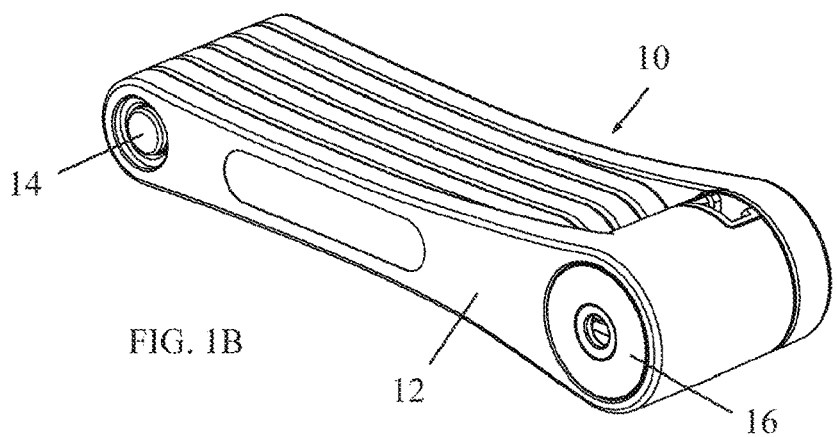

Reference is now made to FIGS. 1A-1B, which illustrate a folding bicycle lock 10, constructed and operative in accordance with a non-limiting embodiment of the present invention.

Bicycle lock 10 includes a plurality of link members 12, which are pivotally connected to one another by joint members 14, such as rivets or pins. In the illustrated embodiment, there are a total of six (6) link members 12, but the embodiment is not limited to this number, and the embodiment can have any other number of link members. Link members 12 are preferably made of a material hardened and dimensioned against cutting or other vandalistic forces (such as a hardened steel alloy or any other suitable material). One of the link members 12 may be connected to a locking device, such as a lock 16, which may be a cylinder lock operated by a key (not shown) or any other type of lock, such as but not limited to, a combination lock, cylinder lock, wafer lock, or wireless communication lock (that operates with a transponder that communicates with identification circuitry in the lock to gain authorized access to the lock), e.g., an RFID lock, NFC lock, Bluetooth lock, Wi-Fi lock, mobile device, and others. Other locking types can also be used. Opening the lock 16 releases a lock insert member 18 (shown in broken lines in FIG. 1A) mounted on the end of one of the link members 12, so as to permit unfolding and stretching out the link members 12. As seen in FIG. 1B, lock 10 may be folded into a compact orientation for easy transport on a bicycle.

As seen in FIG. 2A, the link members 12 may be covered with a non-metallic covering 22, such as a plastic, rubber, silicone or other polymer coating or covering, which is aesthetically pleasing and prevents scraping or scratching the frame of the bicycle. Each link member may be formed with an aperture 24 for the joint member 14 to pass through. In addition, each link member may be formed with an annular groove 26 around the joint member 14.

As will now be described with reference to the rest of the drawings, in accordance with a non-limiting embodiment of the present invention, joint member protectors are provided adjacent each of the joint members 14. The joint member protector may be placed in the annular groove 26. The groove may be circular, hexagonal or any other shape. Alternatively or additionally, the joint member protector may be placed in line with the joint member 14, such as on top of the joint member. The joint member protector is preferably made of a hardened material, such as but not limited to, a steel alloy with Rockwell C hardness of over 20 or over 50 or 50 to 60 or over 60.

In FIGS. 3 and 3A, the joint member protector is a ring 203 that surrounds the shaft of the joint member 14. The ring 203 fills or partially fills groove 26. If a bolt cutter were used to try to cut ring 203, the bolt cutter will not succeed due to the ring abutting against the links and may just deform the ring, making it even more difficult for the bolt cutter to reach the joint member 14. Ring 203 is preferably hardened.

In FIGS. 4 and 4A, the joint member protector is a ring 204 that surrounds the shaft of the joint member 14. The ring 204 only partially fills the groove 26. In this case, ring 204 may freely rotate about joint member 14, which makes tampering with or cutting the ring 204 very difficult. It is noted that the material of the link members 12 separates the ring 204 from the joint member 14. Thus, any deformation of ring 204 by a cutter or other tampering tool will still not succeed in gaining access to the joint member 14, because the cutter or tampering tool will still have to go through the link members 12, which may be hardened against such an attempt, thus making it very difficult to defeat the lock.

Figure 5A:
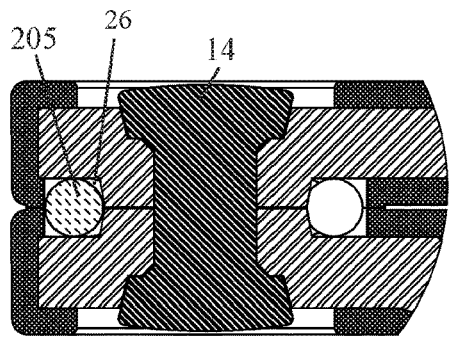
Figure 5:
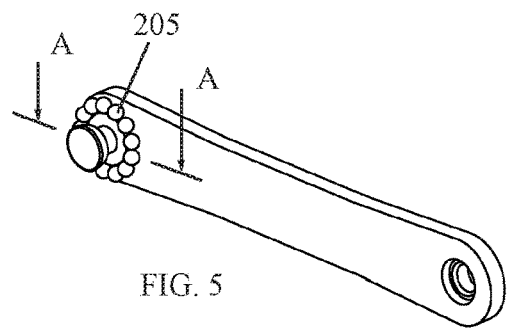

In FIGS. 5 and 5A, the joint member protector is a plurality of balls 205, such as hardened ball bearings, that surround the shaft of the joint member 14. The balls are very difficult to cut through due to their round shape, hardness and freedom to move.

Figure 6A:
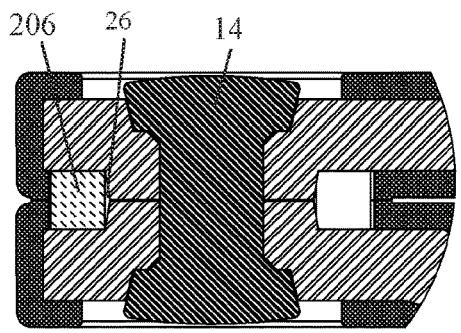
Figure 6:
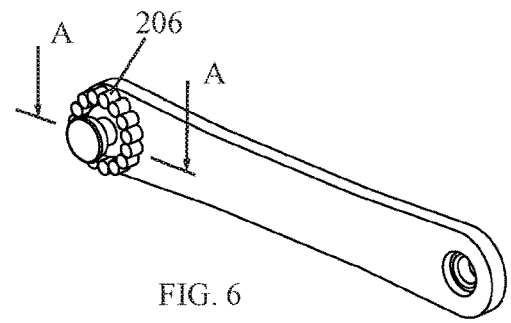

In FIGS. 6 and 6A, the joint member protector is a plurality of rods or cylinders 206, such as hardened roller bearings, that surround the shaft of the joint member 14. The rods or cylinders are very difficult to cut through due to their round shape, hardness and freedom to move.

Figure 7A:
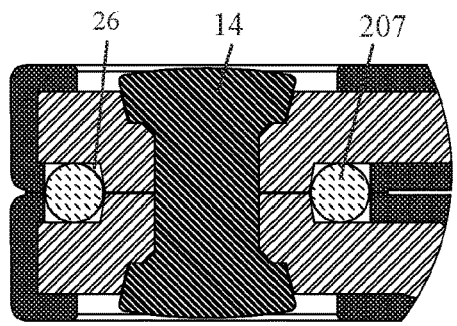
Figure 7:
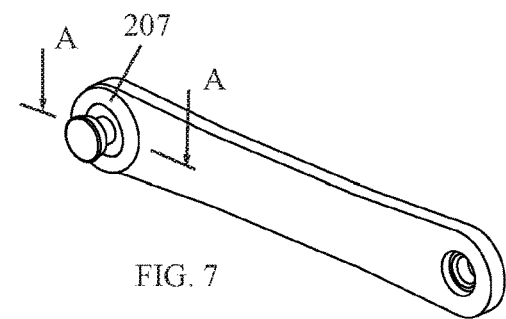

In FIGS. 7 and 7A, the joint member protector is a ring 207 that surrounds the shaft of the joint member 14. The ring 207 fills the groove 26. As opposed to FIGS. 3A and 4A, in which the rings are washers with a rectangular cross-section, here ring 207 has a spherical cross-section.

Figure 8A:
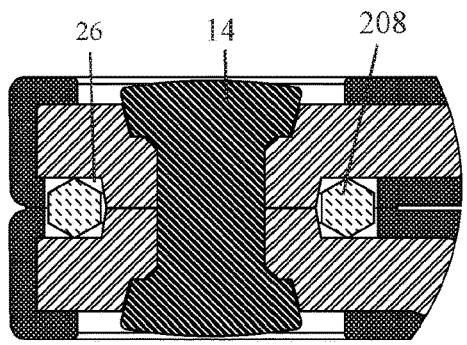
Figure 8:
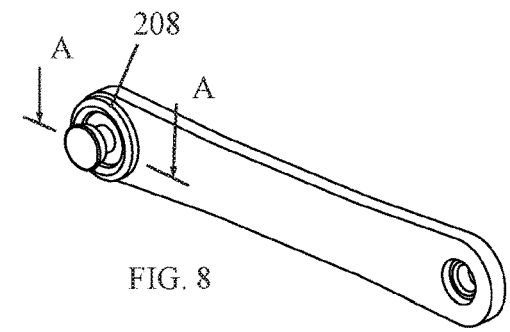

In FIGS. 8 and 8A, the joint member protector is a ring 208 that surrounds the shaft of the joint member 14. The ring 208 fills the groove 26. As opposed to FIGS. 3A and 4A, here ring 208 has a hexagonal cross-section. Other cross-sectional shapes are within the scope of the invention.

In the embodiments of FIGS. 3A-8A, the link members 12 may or may not abut against each other. In other embodiments, the joint member protector is disposed between adjacent link members 12, as is now described with reference to FIGS. 9-10A.

In FIGS. 9, 9A and 9B, the joint member protector is a ring or washer 209 that surrounds the shaft of the joint member 14. The ring 209 may only partially fill the groove 26 as seen in FIG. 9A or may fully fill the groove 26 as seen in FIG. 9B.

In FIGS. 10, 10A and 10B, the joint member protector is a ring or washer 210 that surrounds the shaft of the joint member 14 and has extensions 210A that fill groove 26. Although the joint member protector (washer) 210 does not have to be part of the joint member 14, in the illustrated embodiment, the joint member protector (washer) 210 is part of the joint member 14. In such a case of a unitary construction, the joint member protector may initially be provided as a shaft with no swaged ends. The two opposite ends of the shaft are swaged after the protector is mounted in place.

In the embodiments of FIGS. 9A and 10A, the link members 12 are bent or otherwise formed so that they lay flat only at a central portion of the joint member protector. In the embodiments of FIGS. 9B and 10B, the link members 12 are basically flat over most or the entire joint member protector.

In FIGS. 11 and 11A, the joint member protector is not placed around the joint member, but rather includes a hardened, cylindrical plug 211 placed in a depression at both ends of the joint member 14. Plug 211 prevents drilling into the joint member 14.

Similarly, in FIGS. 12 and 12A, the joint member protector is not placed around the joint member, but rather includes a hardened sphere 212 (e.g., hardened ball bearing) placed in a depression at both ends of the joint member 14. Sphere 212 prevents drilling into the joint member 14.

Figure 13A:
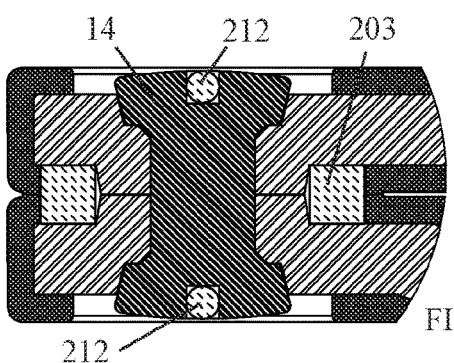
Figure 13:
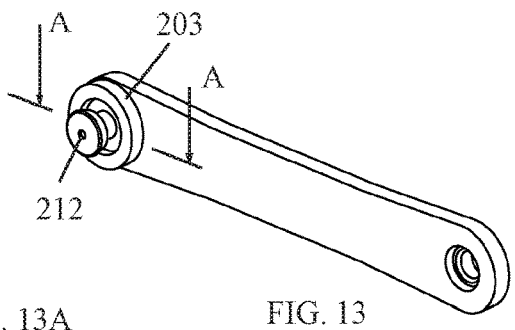

In FIGS. 13 and 13A, the hardened sphere 212 is used together with the ring 203 of FIGS. 3 and 3A, to prevent drilling and cutting.

Figure 14A:
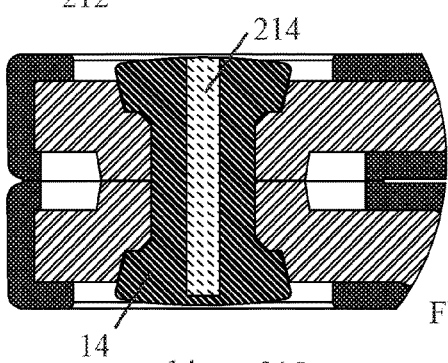
Figure 14:
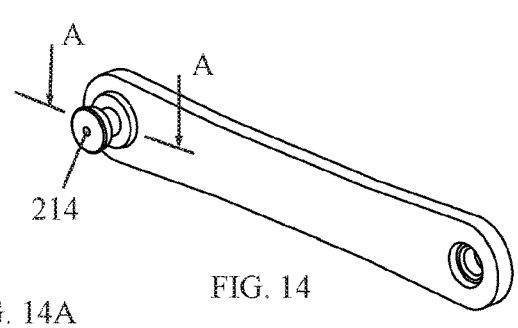

In FIGS. 14 and 14A, the joint member protector includes a hardened core element 214, such as a hardened pin that extends most or all of the length of the joint member 14. The core element 214 may be centrally located or may be positioned off-center relative to the longitudinal axis of the joint member 14.

Figure 15A:
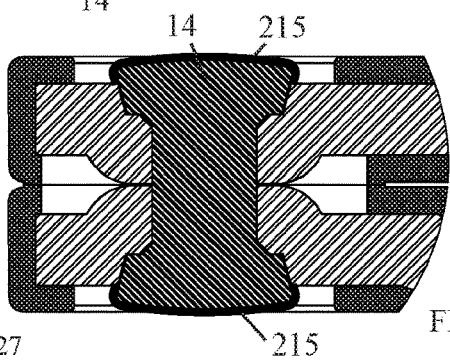
Figure 15:
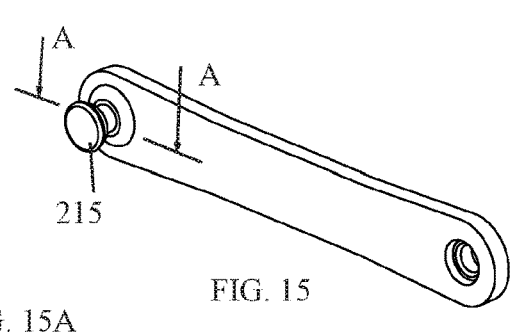

In FIGS. 15 and 15A, the joint member protector includes a hardened covering 215 which is disposed over each of the ends of the joint member 14. The hardened covering 215 prevents drilling into the joint member 14. The hardened covering 215 may be snugly fit over the joint member 14, or alternatively, may be loosely fit so as to rotate during an attempted drilling, making it even harder to drill.

In most of the above embodiments, the joint member protector is separate from the joint member and the link member. In one of the embodiments (FIGS. 10 and 10A), the joint member protector is part of the joint member. In the following embodiments of FIGS. 16-17A, the joint member protector is part of the link member.

Figure 16A:
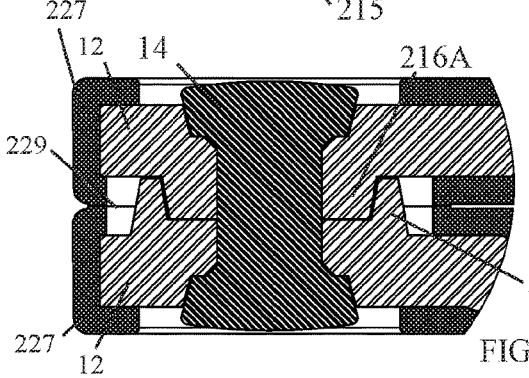
Figure 16:
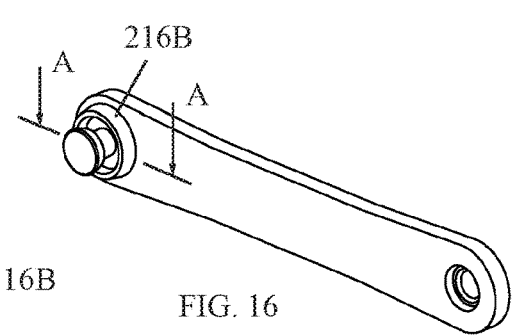
Figure 17A:
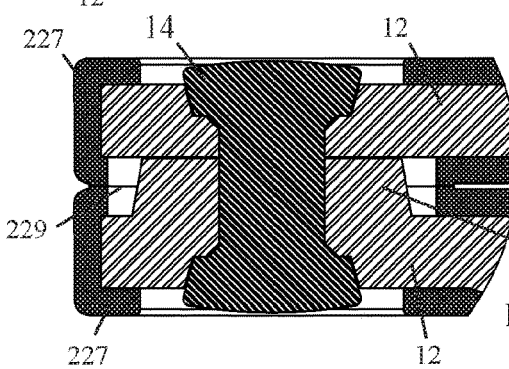
Figure 17:
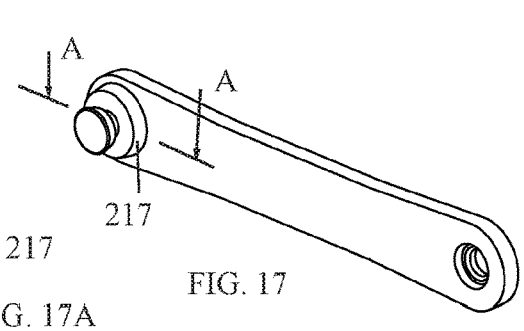

In FIGS. 16 and 16A, the joint member protector includes mating male and female members 216A and 216B formed on adjacent link members 12. In FIGS. 17 and 17A, the joint member protector includes a protrusion 217 that protrudes from one of the pair of adjacent link members 12. The other of the pair has no such protrusion. The protrusion 217 prevents a tool from entering and separating the links from each other to gain access to the joint member 14 and prevents a tool from entering and cutting through the joint member 14. Cutting tools and other tampering tools attempt to enter the lock where the coverings 227 of the link members 12 abut each other (this line of abutment is designated by numeral 229.) However, the mating line between the male and female members 216A and 216B in FIGS. 16 and 16A is offset from this abutment line 229. Similarly, the protrusion 217 in FIGS. 17 and 17A crosses over and is offset from this abutment line 229. This significantly improves protection of the joint member because if a tool attempts to pass through the abutment line 229 it will come up against the protrusion 216B of the link member 12 in FIG. 16A or against the protrusion 217 in FIG. 17A. The tool cannot spread apart the link members because it is working against the protrusion. The protrusions and link members of FIGS. 16-17A may be hardened which also protects against the tool.

The same holds true for all of the embodiments of the invention: the joint member protector crosses over the abutment line and any tool that attempts to enter through the abutment line to spread apart the link members to reach the joint member, or to try to cut the joint member without spreading apart the link members, is blocked by the joint member protector. It is noted that any feature of one embodiment may be incorporated in other embodiments as well.

What is claimed is:

1. A bicycle lock comprising:
    a plurality of link members, which are pivotally connected to one another by joint members, each joint member passing through an aperture formed in each of said link members, one of said link members being connected to a locking device and each of said link members being formed with an annular groove around said joint member,
    wherein a joint member protector, which has a rounded surface, is adjacent each of said joint members;
    and wherein said joint member protector comprises a plurality of balls, or a plurality of rods or cylinders, or a hardened, cylindrical plug or sphere placed in a depression at both ends of said joint member, or a hardened core element that extends most or all of a length of said joint member, or mating male and female members formed on adjacent link members, or a protrusion that protrudes from one of a pair of adjacent link members.

2. The bicycle lock according to claim 1, wherein said joint member protector is placed in said annular groove.

3. The bicycle lock according to claim 1, wherein said joint member protector is coaxial with its corresponding joint member.

4. The bicycle lock according to claim 1, wherein said joint member protector fills said annular groove.

5. The bicycle lock according to claim 1, wherein said joint member protector only partially fills said annular groove and freely rotates about its corresponding joint member.

6. The bicycle lock according to claim 1, wherein said joint member protector is disposed between adjacent link members.

\* \* \* \* \*